US008355515B2

(12) United States Patent
Mao et al.

(10) Patent No.: US 8,355,515 B2
(45) Date of Patent: Jan. 15, 2013

(54) GAMING HEADSET AND CHARGING METHOD

(75) Inventors: Xiadong Mao, Foster City, CA (US); Ruxin Chen, Redwood City, CA (US); Seth C. H. Luisi, Millbrae, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1314 days.

(21) Appl. No.: 12/099,046

(22) Filed: Apr. 7, 2008

(65) Prior Publication Data

US 2009/0252344 A1 Oct. 8, 2009

(51) Int. Cl.
*H04R 1/10* (2006.01)
*H04R 25/00* (2006.01)
*H04M 1/00* (2006.01)
*H04M 9/00* (2006.01)

(52) U.S. Cl. .......... 381/74; 381/374; 381/375; 381/376; 455/569.1; 455/570; 455/575.2; 379/428.01; 379/428.02; 379/430; 379/433.01; 379/433.02; 379/433.03

(58) Field of Classification Search .................... 381/74, 381/370, 309–311, 77–81, 374–376; 455/573, 455/569.1, 570, 575.2; 320/112–115; 379/428.01–428.02, 430, 433.01–433.03
See application file for complete search history.

(56) References Cited

U.S. PATENT DOCUMENTS 4,882,745 A * 11/1989 Silver ......................... 455/575.2
5,673,325 A * 9/1997 Andrea et al. .................. 381/92
5,715,321 A * 2/1998 Andrea et al. .................. 381/92
6,549,630 B1 * 4/2003 Bobisuthi .................... 381/94.7
6,760,459 B2 7/2004 Bae
6,952,617 B1 * 10/2005 Kumar .............................. 700/1
7,305,258 B2 * 12/2007 Rydgren et al. .............. 455/573
(Continued)

FOREIGN PATENT DOCUMENTS

JP 8508147 8/1996
(Continued)

OTHER PUBLICATIONS

The International Search Report and The Written Opnion of the International Searching Authority dated Oct. 22, 2009 for International application No. PCT/US2009/037319.

(Continued)

*Primary Examiner* — Matthew W Such
*Assistant Examiner* — Jeremy Joy
(74) *Attorney, Agent, or Firm* — Joshua D. Isenberg; JDI Patent

(57) ABSTRACT

An audio headset may comprise a case, near field microphone and far field microphone. A speaker, processor, memory, battery, charging interface and cradle detection circuit may be mounted to the case. Processor-executable instructions embodied in the memory, may be configured to implement a battery charging method. The headset may be shut off in response to placement of the headset in a charging cradle. The far-field microphone is turned on but not the near-field microphone. The battery may then be charged from the cradle. A headset having near-field and far-field microphones may be used to distinguish between user speech and competing sounds by generating signals from the sounds detected by each microphone and comparing the strengths of the signals. The signals may be processed as user speech if they are of comparable strength. Otherwise, the near-field signal may be processed as user speech and the far-field signal as competing sounds.

14 Claims, 4 Drawing Sheets

U.S. PATENT DOCUMENTS

| | | | | |
|---|---|---|---|---|
| 7,436,427 | B2 * | 10/2008 | Basmadjian et al. | 348/14.01 |
| 7,627,352 | B2 * | 12/2009 | Gauger et al. | 455/569.1 |
| 7,720,232 | B2 * | 5/2010 | Oxford | 381/66 |
| 7,931,537 | B2 * | 4/2011 | Filer et al. | 463/47 |
| 7,983,907 | B2 * | 7/2011 | Visser et al. | 704/227 |
| 2002/0131585 | A1 * | 9/2002 | Jones et al. | 379/431 |
| 2003/0118197 | A1 * | 6/2003 | Nagayasu et al. | 381/74 |
| 2004/0162026 | A1 * | 8/2004 | Hong | 455/41.2 |
| 2005/0162508 | A1 * | 7/2005 | Basmadjian et al. | 348/14.01 |
| 2005/0272477 | A1 * | 12/2005 | Boykins et al. | 455/569.1 |
| 2006/0252457 | A1 * | 11/2006 | Schrager | 455/556.1 |
| 2006/0252470 | A1 * | 11/2006 | Seshadri et al. | 455/575.2 |
| 2007/0004473 | A1 * | 1/2007 | Clark et al. | 455/575.2 |
| 2008/0152167 | A1 * | 6/2008 | Taenzer | 381/94.2 |
| 2008/0175408 | A1 * | 7/2008 | Mukund et al. | 381/94.1 |
| 2008/0201138 | A1 * | 8/2008 | Visser et al. | 704/227 |
| 2008/0260169 | A1 * | 10/2008 | Reuss | 381/58 |
| 2008/0260175 | A1 * | 10/2008 | Elko | 381/73.1 |
| 2009/0109054 | A1 * | 4/2009 | Ueda et al. | 340/825.72 |
| 2010/0164432 | A1 * | 7/2010 | Yang et al. | 320/111 |
| 2011/0059697 | A1 * | 3/2011 | Janik | 455/41.2 |

FOREIGN PATENT DOCUMENTS

| | | | |
|---|---|---|---|
| JP | 2002101190 | | 4/2002 |
| JP | 2002247173 | | 8/2002 |
| JP | 2003198719 | | 7/2003 |
| JP | 2006074670 | | 3/2006 |
| JP | 2006074671 | | 3/2006 |
| JP | 2006074671 | A * | 3/2006 |
| JP | 2007322182 | | 12/2007 |

OTHER PUBLICATIONS

Japan Office Action issued date :Mar. 21, 2012 for Japan Patent application No. 2011-503020.

* cited by examiner

GAMING HEADSET AND CHARGING METHOD

FIELD OF THE INVENTION

Embodiments of this invention are related to computer gaming and more specifically to audio headsets used in computer gaming.

BACKGROUND OF THE INVENTION

Many video game systems make use of a headset for audio communication between a person playing the game and others who can communicate with the player's gaming console over a computer network. Many such headsets can communicate wirelessly with a gaming console. Such headsets often contain a microphone and speakers that are power by a battery and wireless transceivers. If the gaming headset battery goes down, the game could go down. To permit charging of the battery during play many headsets make use of a charging mechanism such as a charging cradle or Universal Serial Bus (USB) port. However, for safety reasons it is undesirable to use a USB charger on a gaming headset during use. Charging the headset battery with the charging cradle is generally safer since it keeps the headset away from the user's head during charging. However, placing the headset in a charging cradle generally makes the headset microphone and speakers unavailable to the user during charging.

It is within this context that embodiments of the present invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, examples of embodiments of the invention described below are set forth without any loss of generality to, and without imposing limitations upon, the claimed invention.

Figure 1:
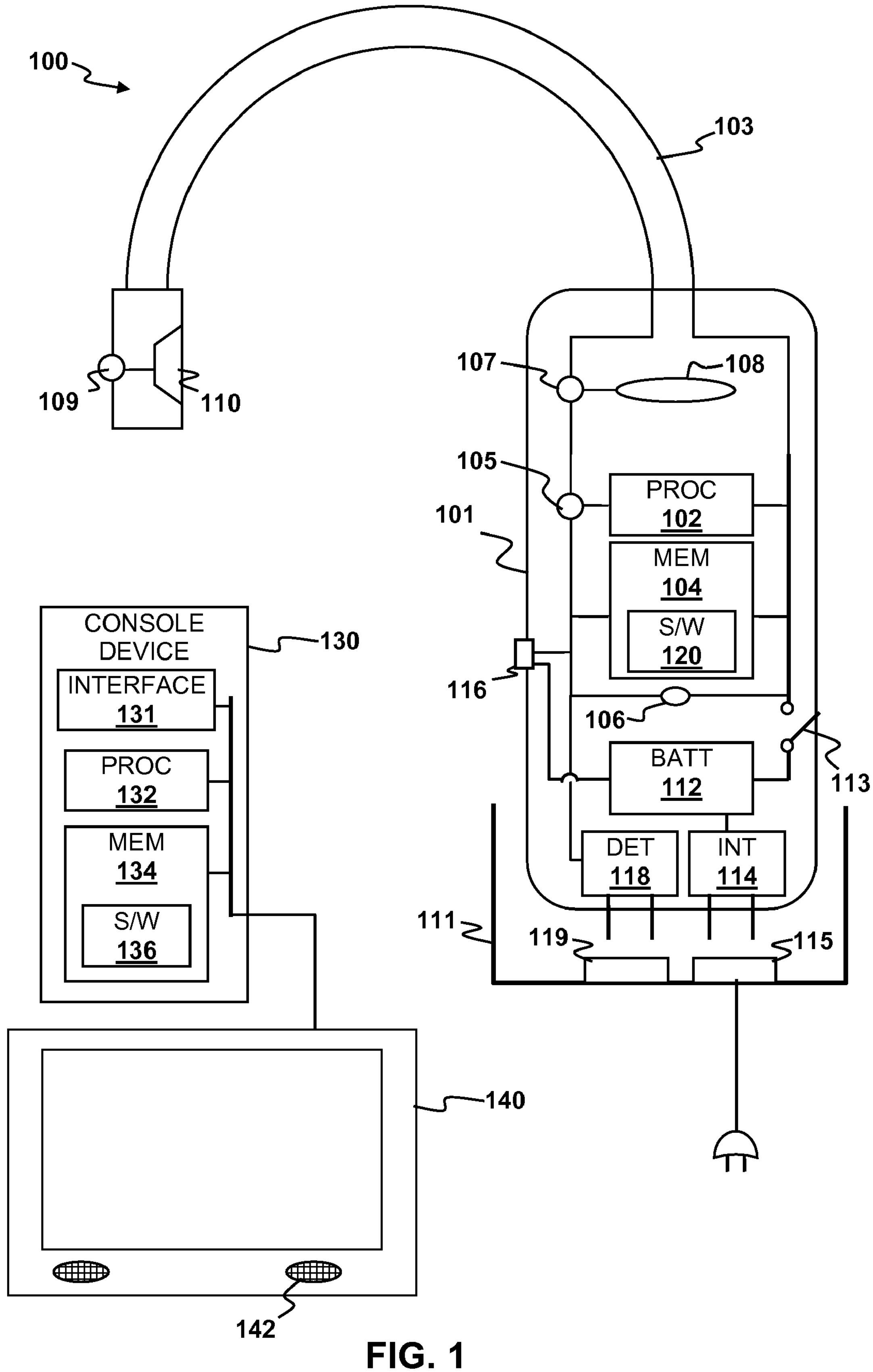
FIG. 1 is a schematic diagram of an audio headset according to an embodiment of the present invention.

A according to an embodiment of the present invention an audio headset 100 may be configured as shown in FIG. 1. The headset 100 is interoperable with a charging cradle 111 and a console device 130, which may include its own processor 132, memory 134 and software 136. By way of example, the console device may be a video game device (e.g., a PlayStation 3 from Sony Computer Entertainment Inc. of Tokyo, Japan) coupled to an audio-video monitor 140, such as a television set. The headset 100 may include a case 101. A processor 102 may be mounted to the case 101. A memory 104 may be mounted to the case 101 and coupled to the processor 102. A near-field microphone 106, a far-field microphone 108 and a headset speaker 110 may be mounted to the case 101 and coupled to the processor 102. The near-field microphone 106 is configured to detect speech from a user of the headset 100, when the user is wearing the headset. The far-field microphone 108 may be configured to detect remote sounds that might not be detected by the near-field microphone 106. The speaker 110 may be physically mounted to the case via a resilient band 103 that is configured to fit over the user's head or ear in such a way as to place the speaker in relatively close proximity to the user's ear. In some embodiments, the near-field microphone 106 may be mounted to the case 101 by a stem (not shown) that is configured to place the near-field microphone in close proximity to the user's mouth.

The headset 100 may include a first audio signal interface 105 coupled to the near-field microphone 106 and a second audio signal interface 107 coupled to the far-field microphone 108. In addition, a third audio signal interface 109 may be coupled to the headset speaker 110 and processor 102. The audio interfaces 105, 107 and 109 may be configured to facilitate transfer of audio signals, in digital or analog form, between the headset 100 and the console device 130 via a console interface 131. One or more of the audio interfaces 105, 107, 109 and the console interface 131 may be wireless interfaces, e.g., implemented according to a personal area network standard, such as the Bluetooth standard. In some embodiments, the functions of all three interfaces 105, 107, 109 may be implemented by a single component coupled to the processor 102.

A rechargeable battery 112 may be mounted to the case 101 and coupled to the processor 102, memory 104, near-field microphone 106, far-field microphone 108 and headset speaker 110 to provide electrical power to these components. The battery 112 may be charged through one or more charging interfaces including a cradle charging interface 114 and one or more alternative charging interfaces 116, such as a Universal Serial Bus (USB) interface. To facilitate charging the battery in accordance with embodiments of the invention, the headset 100 may include a cradle detection circuit 118 mounted to the case 101 and coupled to the processor 102. The cradle detection circuit 118 may be configured to electrically contact a corresponding interface 119 on the cradle 111. By way of example, the cradle detection circuit 118 may include two electrodes that form an open circuit when the headset 100 is not in the cradle 111. The cradle may include a corresponding electrode that closes the circuit when the headset is placed in the cradle. The cradle 111 may be connected to a power source, such as a wall outlet so that electrical current may flow from an interface 115 on the cradle 111 through the cradle interface 114 on the headset 100 to charge the battery 112. The headset 100 may optionally include a power switch 113 coupled to the battery 112 to permit the user to manually turn the headset on and off.

Figure 2:
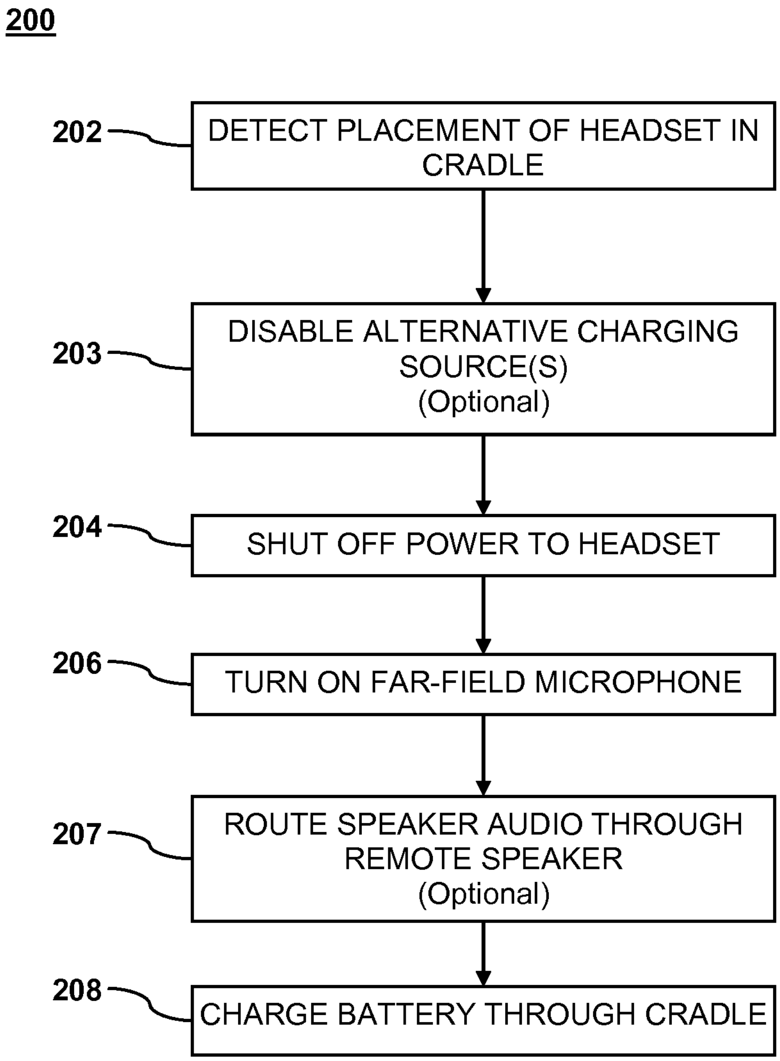
FIG. 2 is a flow diagram illustrating a method for charging an audio headset according to an embodiment of the present invention.

To facilitate charging of the battery 112, the processor may execute software 120, which may be stored in the memory 104. The software 120 may include a set of processor-executable instructions that are configured, when executed on the processor 102 to implement a method 200 for charging the battery 112 in accordance with an embodiment of the present invention. The method 200 may be understood by referring simultaneously to FIG. 1 and the flow diagram shown in FIG. 2. According to the method 200, the battery 112 in the headset 100 may be charged by first detecting placement of the headset 100 in the charging cradle 111, as indicated at 202. By way of example, the cradle detection circuit 118 may provide a signal that sets a value of a flag in the software 120 when the headset is in the charging cradle 111. In some embodiments, any other charging source connected to one of the alternative charging interfaces 116 may be disabled after detecting placement of the headset 100 in the cradle 111, as indicated at 203.

After the software 120 detects that the headset has been placed in the cradle, the software may then shut off the headset 100, including the near-field microphone 106, far-field microphone 108 and headset speaker 110 in response to detecting placement of the headset in the charging cradle, as indicated at 204. In some embodiments, the power switch 113 may be coupled to both the battery 112 and the processor 102. The software 120 and power switch 113 may be configured to permit a user to turn on the headset after the power has been turned off at 204. After the power has been turned off at 204, far-field microphone 108 may then be turned on but not the near-field microphone 106, as indicated at 206, and the battery 112 may be charged with the charging cradle 111 as indicated at 208. This allows the user transmit speech to the console 130 through the far-field microphone while the headset battery is being charged on the cradle 111.

After the headset has been shut off, the software 120 may optionally route audio signals for the headset speaker 110 to a remote speaker that is not part of the headset, as indicated at 207. By way of example, the remote speaker may be a speaker 142 associated with the audio-visual monitor 140, e.g., a television speaker. This allows the user to receive audio from the console 130 while the headset battery 112 is charging on the cradle 111. The routing of the audio signals to the remote speaker 142 may be implemented in whole or in part by the software 136 running on the processor 132 in the console device 130.

Using an apparatus and method of the type described above, when a headset battery is low—the console device 130 may notify the user visually and audibly. The user can place headset 100 on the cradle 111. The headset goes into a charging mode after shutting down. The user can turn on headset while it is in cradle using the power switch 113. The headset can detect that it is in the cradle without USB connection using the cradle detection circuit 118. During the charging mode, the headset may perform functions such as establishing a wireless connection to the console device 130 (e.g., Bluetooth pairing).

An apparatus and method involving a headset with both a near-field and far-field microphone may use differentiation between audio signal strength at near-field and far-field microphones to distinguish between user speech and competing speech. User speech is strong at both microphones. Other speech and sounds are only strong at the far-field microphone. By way of example, according to an alternative embodiment shown in FIG. 3, an audio headset 300 may include a case 301, a near-field microphone 302 mounted to the case and a far-field microphone 304 mounted to the case. The case 301 may be configured to removeably mount to a user's body, e.g., a user's head. By way of example, the case 301 may include a resilient band 303 configured to attach the case to a user's head or ear. The headset 300 may include a first audio signal interface 305 coupled to the near-field microphone 302 and a second audio signal interface 307 coupled to the far-field microphone 304. The headset may include a speaker 310, which may be coupled to an audio interface 309. The audio interfaces 305, 307 and 309 may be configured to facilitate transfer of audio signals, in digital or analog form, between the headset 300 and a console device 330. The media device 330 may include an interface 331 (e.g., a wireless transceiver) configured to communicate with the speakers the microphones 302, 304 and speaker 310 via the interfaces 305, 307, and 309. The console device may be coupled to a video monitor 340 having one or more speakers 342. The audio interfaces may be wireless interfaces, e.g., implemented according to a personal area network standard, such as the Bluetooth standard. The interfaces 305, 307 and 309 may be implemented with a single component, e.g., as described above with respect to FIG. 1.

The headset 300 may be used in conjunction with a method 400 for distinguishing between user speech and competing sounds according to an embodiment of the present invention. By way of example and without limitation, the method 400 may be implemented by software 320 running on a processor 332 that is part of the console device 330. The software 320 may be stored in a memory 334 coupled to the console processor 332. Alternatively, the software 320 may be implemented on a processor and memory that are part of the headset 300.

Figure 3:
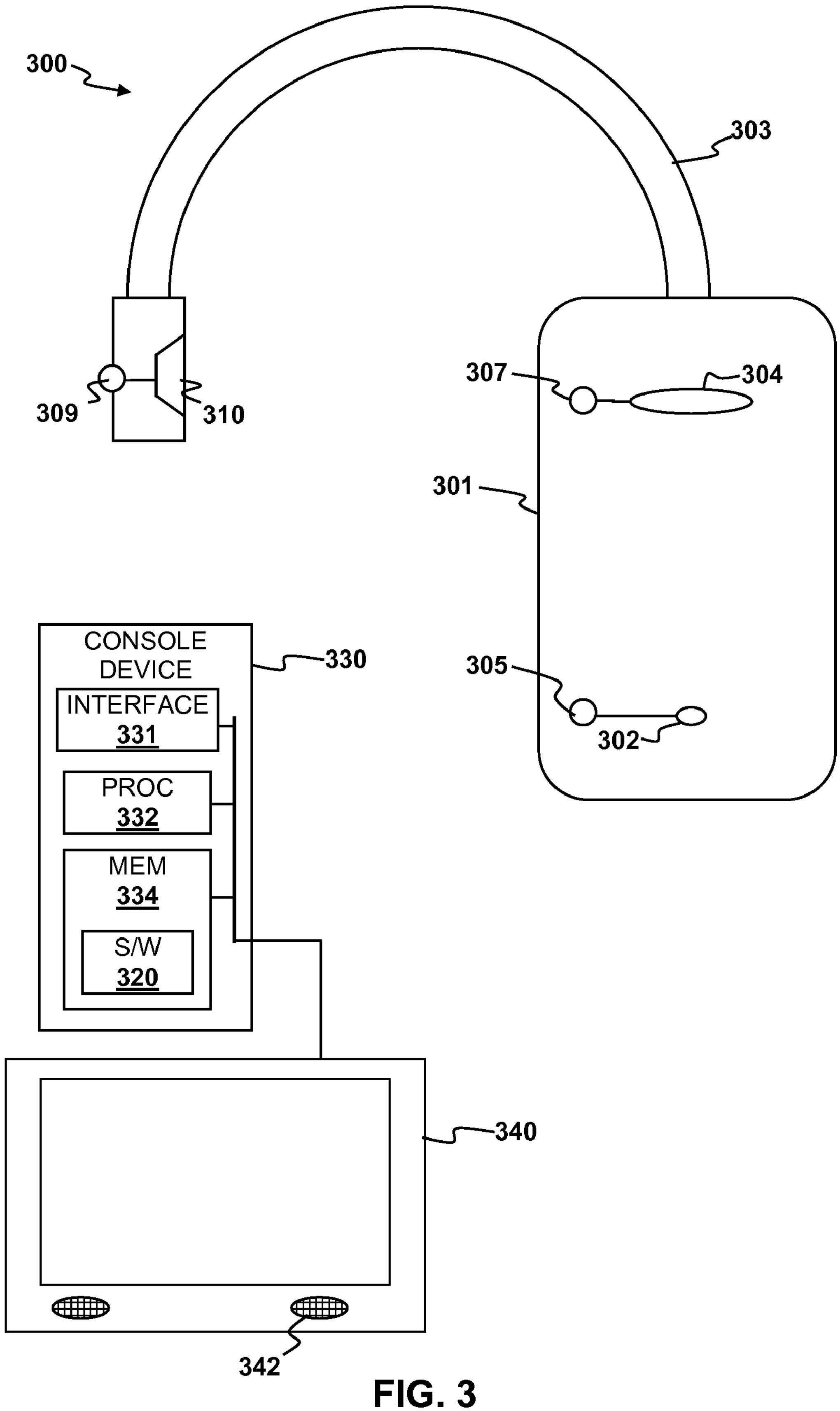
FIG. 3 is a schematic diagram of a video game system utilizing an audio headset of the type shown in FIG. 1
Figure 4:
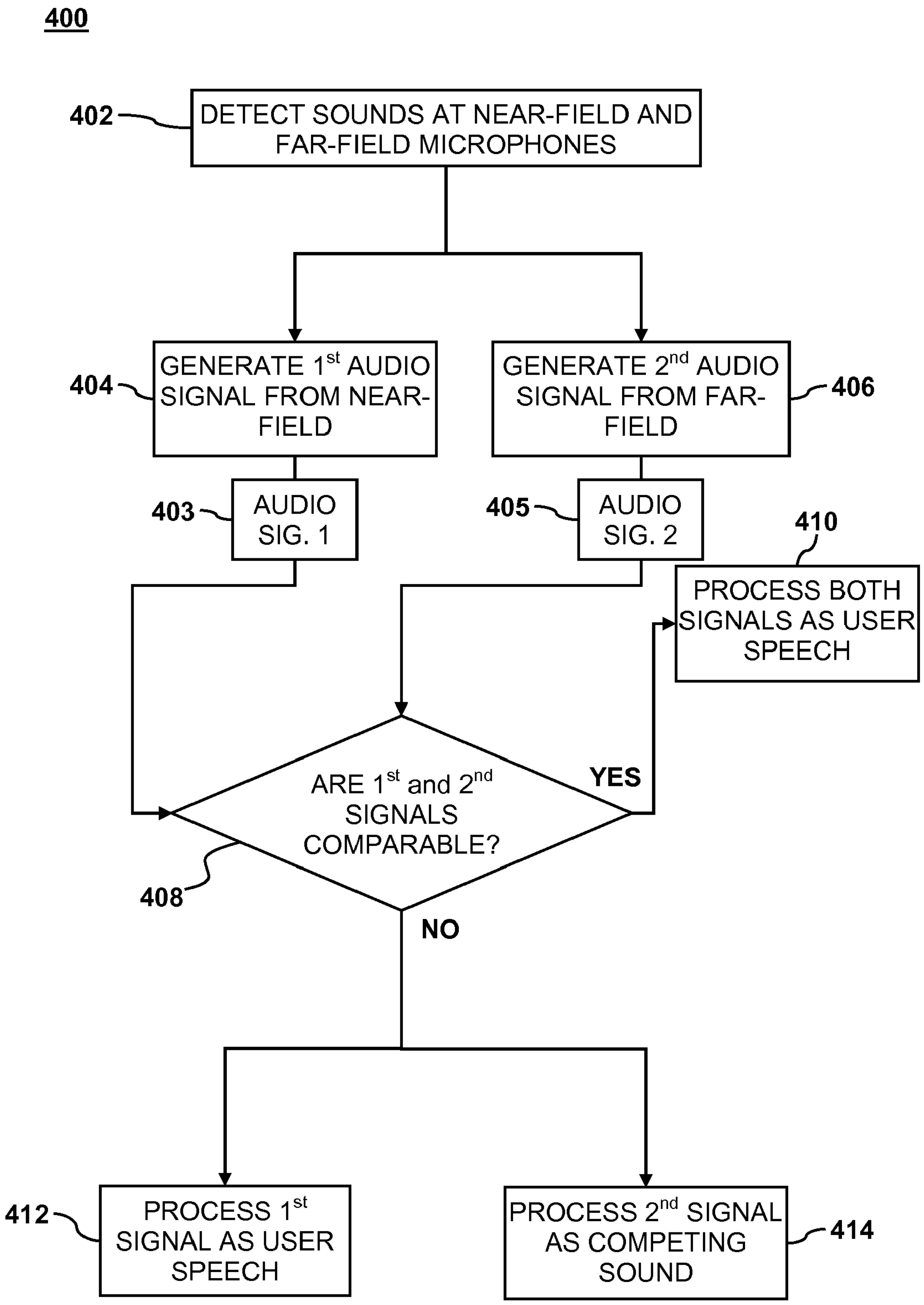
FIG. 4 is a flow diagram of a method for distinguishing between user speech and competing sounds in an audio headset of the type shown in FIG. 1.

The method 400 may be understood by referring simultaneously to FIG. 3 and FIG. 4. Specifically, as indicated at 402 sounds may be detected at the near-field microphone 302 and the far-field microphone 304. A first audio signal 403 may be generated from the sound detected by the near-field microphone 302, as indicated at 404. Similarly, a second audio signal 405 may be generated from the sound detected by the far-field microphone 304, as indicated at 406. Then, at 408 the strength of the first audio signal 403 may be compared to the strength of the second audio signal 405. If the first and second audio signals are of comparable strength they may be processed as user speech, as indicated at 410. Alternatively, if the first and second audio signals are not of comparable strength the first audio signal 403 may be processed as user speech, as indicated at 412 and the second audio signal 405 may be processed as competing sound as indicated at 414. By way of example, a signal proportional to the second audio signal may be subtracted from a signal proportional to the first audio signal to remove competing sounds from the first audio signal.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for".

What is claimed is:

1. A method for charging an audio headset having a near-field microphone, a far-field microphone, a headset speaker and a battery, the method comprising:

a) detecting placement of the headset in a charging cradle;

b) shutting off the headset including the headset speaker, near-field microphone and far-field microphone in response to detecting placement of the headset in the charging cradle;

c) turning on the far-field microphone but not the near-field microphone; and d) charging the battery with the charging cradle.

2. The method of claim 1, further comprising after a) disabling any charging source coupled to the headset other than the charging cradle.

3. The method of claim 1, further comprising, after b) routing audio signals for the headset speaker to a remote speaker that is not part of the headset.

4. The method of claim 3 wherein the remote speaker is a television speaker.

5. The method of claim 3 wherein the headset and remote speaker are coupled to a system console.

6. The method of claim 5 wherein the system console is a video game system console.

7. The method of claim 1 wherein a) includes using a circuit on the headset to detect whether the headset is placed in the charging cradle.

8. An audio headset, comprising:

a case;

a processor mounted to the case;

a memory mounted to the case and coupled to the processor;

a near-field microphone mounted to the case and coupled to the processor;

a far-field microphone mounted to the case and coupled to the processor;

a headset speaker mounted to the case and coupled to the processor;

a battery mounted to the case and coupled to the processor, memory, near-field microphone, far-field microphone and headset speaker;

a cradle detection circuit mounted to the case and coupled to the processor;

a charging interface mounted to the case and coupled to the battery and the processor; and a set of processor-executable instructions embodied in the memory, wherein the instructions are configured, when executed to implement a method for charging the battery, wherein the method comprises:

a) shutting off the headset including the headset speaker, near-field microphone and far-field microphone in response to detecting placement of the headset in the charging cradle with the cradle-detection circuit;

c) turning on the far-field microphone but not the near-field microphone; and d) charging the battery from the charging cradle through the charging interface.

9. The audio headset of claim 8, wherein the instructions are further configured to disable any charging source coupled to the headset other than the charging cradle in response to detecting placement of the headset in the charging cradle with the cradle-detection circuit.

10. The audio headset of claim 8, further comprising an audio signal interface coupled to the near-field microphone.

11. The audio headset of claim 8, further comprising an audio signal interface coupled to the far-field microphone.

12. The audio headset of claim 8, further comprising an audio signal interface coupled to the processor and the headset speaker.

13. The audio headset of claim 12, wherein the instructions are further configured to route audio signals for the headset speaker to a remote speaker that is not part of the headset after a).

14. The audio headset of claim 8, further comprising a manual power switch coupled to the battery, wherein the manual power switch is configured to permit a user to turn on the headset after a).

* * * * *